Sept. 29, 1953 — L. B. GRIFFITH — 2,653,907
SEWAGE RECIRCULATION
Filed Dec. 6, 1948 — 4 Sheets-Sheet 1

Inventor:
L. B. Griffith,
By Henry H. Snelling
Attorney

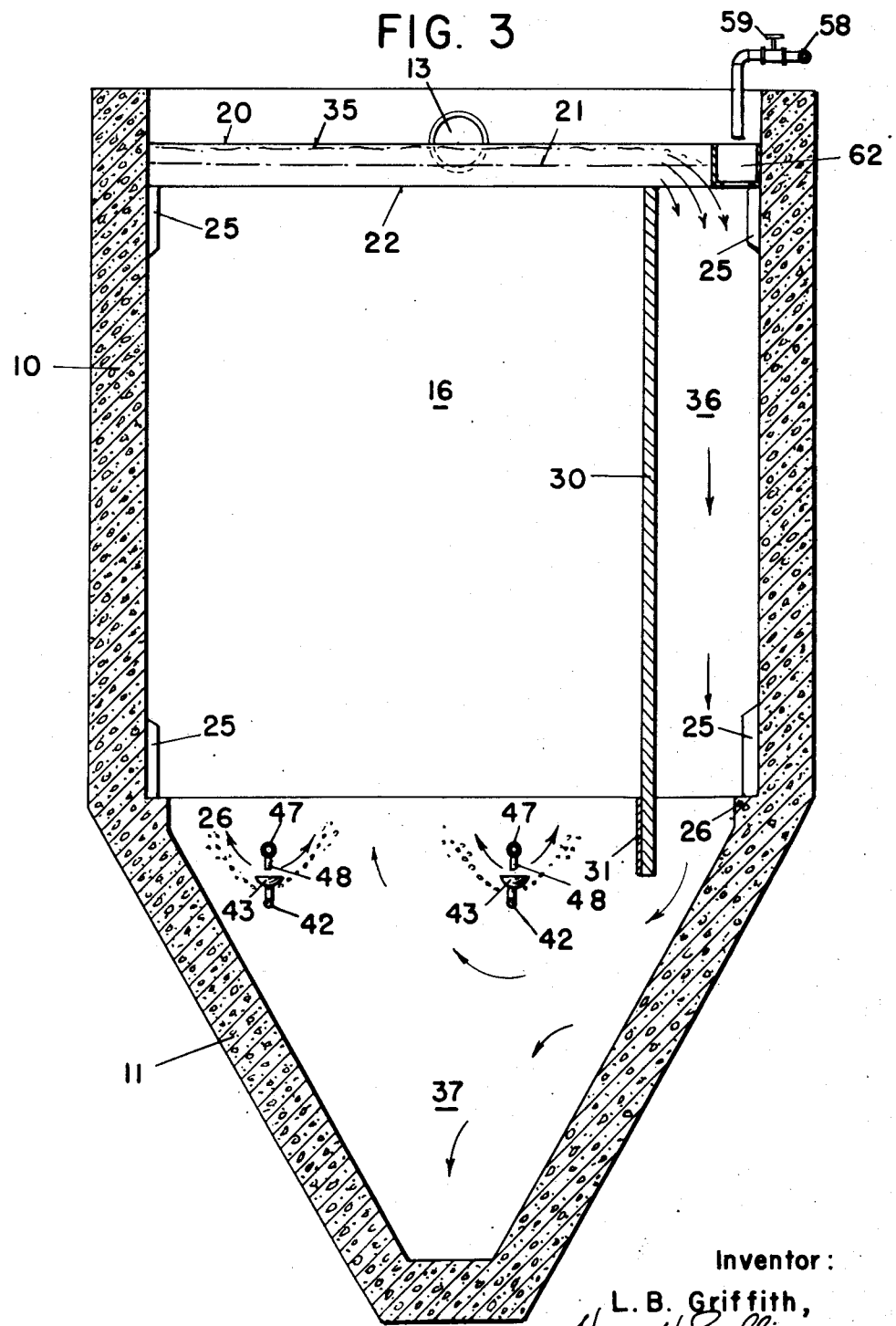

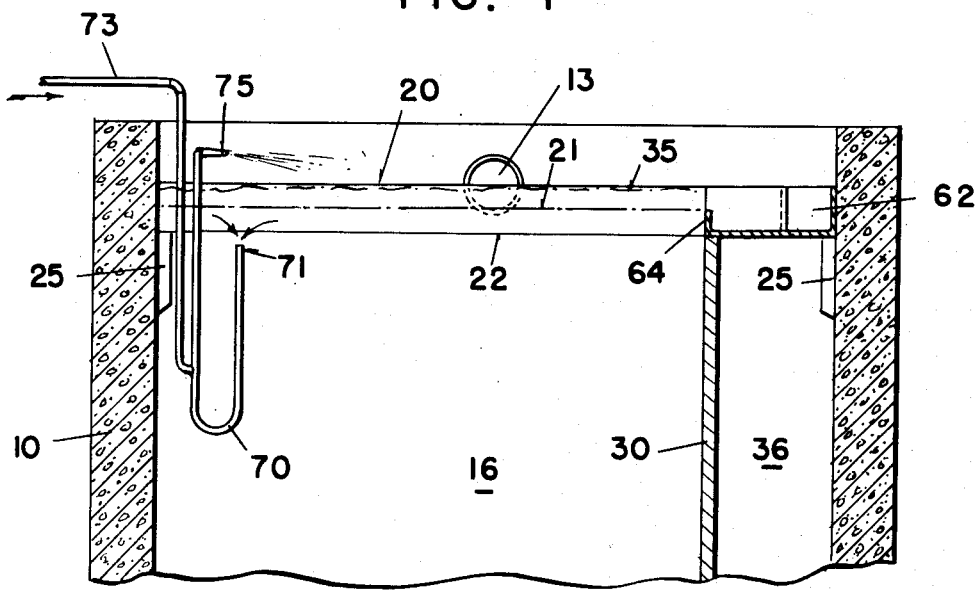
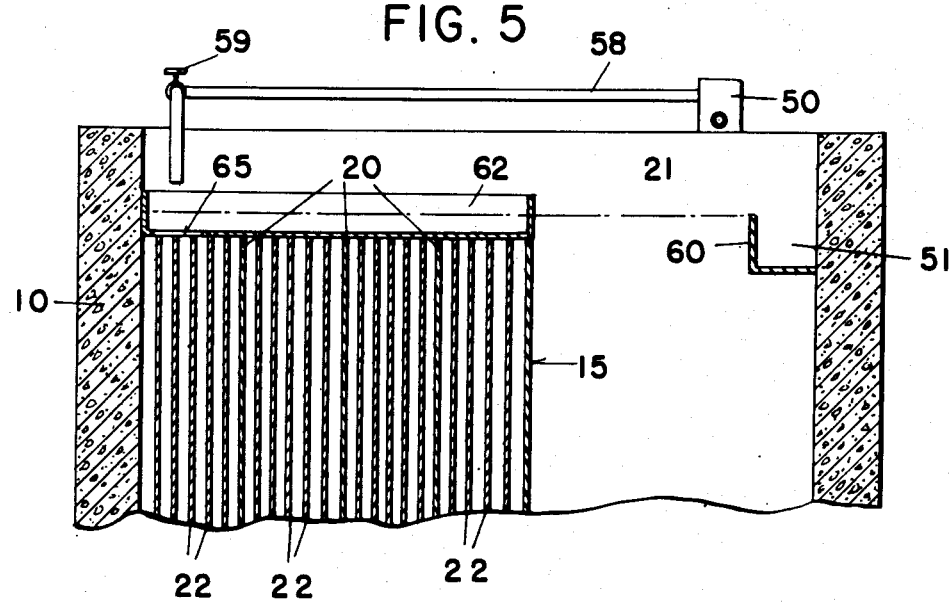

Patented Sept. 29, 1953

2,653,907

UNITED STATES PATENT OFFICE 2,653,907

SEWAGE RECIRCULATION

Llewellyn Brooks Griffith, Austin, Tex.

Application December 6, 1948, Serial No. 63,799

6 Claims. (Cl. 210—8)

This invention relates to sewage treatment and has for its principal object the provision of a method of flow which will make the system more efficient, provide easy control of sewage strength thru recirculation and reduce the cost of the apparatus for carrying out the system.

An incidental object of the invention is to provide a contact-clarifier unit that is a sewage treatment tank in which there is an aeration chamber or compartment and a subsequent clarifier or settling tank. Another incidental object of the invention is to provide means whereby recirculation of the liquid can be obtained at will from either the effluent flow from the settling compartment or from the final stage of the aeration portion of the tank whereby when the quantity of sewage is exceptionally small or exceptionally large, the recirculation liquid can be so chosen as to provide the desired time in the settling chamber. A further incidental object of the invention is to provide a system of air injectors located in such manner that the air providing unit including its water pipes can be removed without disturbing the plates which otherwise must all be removed in order to get at the air pipes.

A major object of the invention is to provide a system for removing from between the aeration plates the flocs which have become loose and which if not removed would tend to lessen the flow between the plates in such a fashion that the flocculent material which has been torn loose from the plates, or at least discharged from them, shall not pass to the subsequent settling section but will be removed by settling below the aeration section of the contact-clarifier tank, or when an aeration chamber forms an entire tank, the sludge should be removed from this tank and not passed to the subsequent settling tank. If we increase the amount of liquid material that passes to the settling tank, we must increase the size of such tank because the material should remain from an hour to an hour and a half in the settling tank shown. The settling time in the initial tank, which forms no part of the present invention, is greater but too long a detention period causes the liquid to become septic.

A further object of the invention is to insure a helical path for the sewage liquid while passing thru the various plates of the aeration chamber. this object being achieved by erecting a partition or baffle at one side of the series of plates so that thru the major area the flow carrying many air bubbles will be upward and relatively slow while thru the smaller area, between near wall side and the baffle, the flow will be downward and relatively swift so as to create the desired whirling action throughout the entire plate zone but allowing the down-flowing stream free of air bubbles to pass to the hopper bottom of the tank, there to form a sludge blanket, minimizing turbulence below it and therefore permitting the solid particles to fall to the bottom of the hopper.

A still further object of the invention is to provide a deflector at the boundary of the aeration and settling chambers and well below the aeration portion so as to prevent any carbon dioxide gas bubbles from flowing upwardly to the settling compartment. It is substantially impossible to prevent the formation of these bubbles in the very bottom of the hopper because there is no oxygen present in this portion of the tank but there is no objection to the gas bubbles flowing upwardly thru the aeration section.

In the drawings:

Figure 3 is a vertical section on line 3—3 of Figure 1.

Figure 4 is a partial section on line 4—4 of Figure 1, and

Figure 5 is a partial section on line 5—5 of Figure 1.

Figure 1:
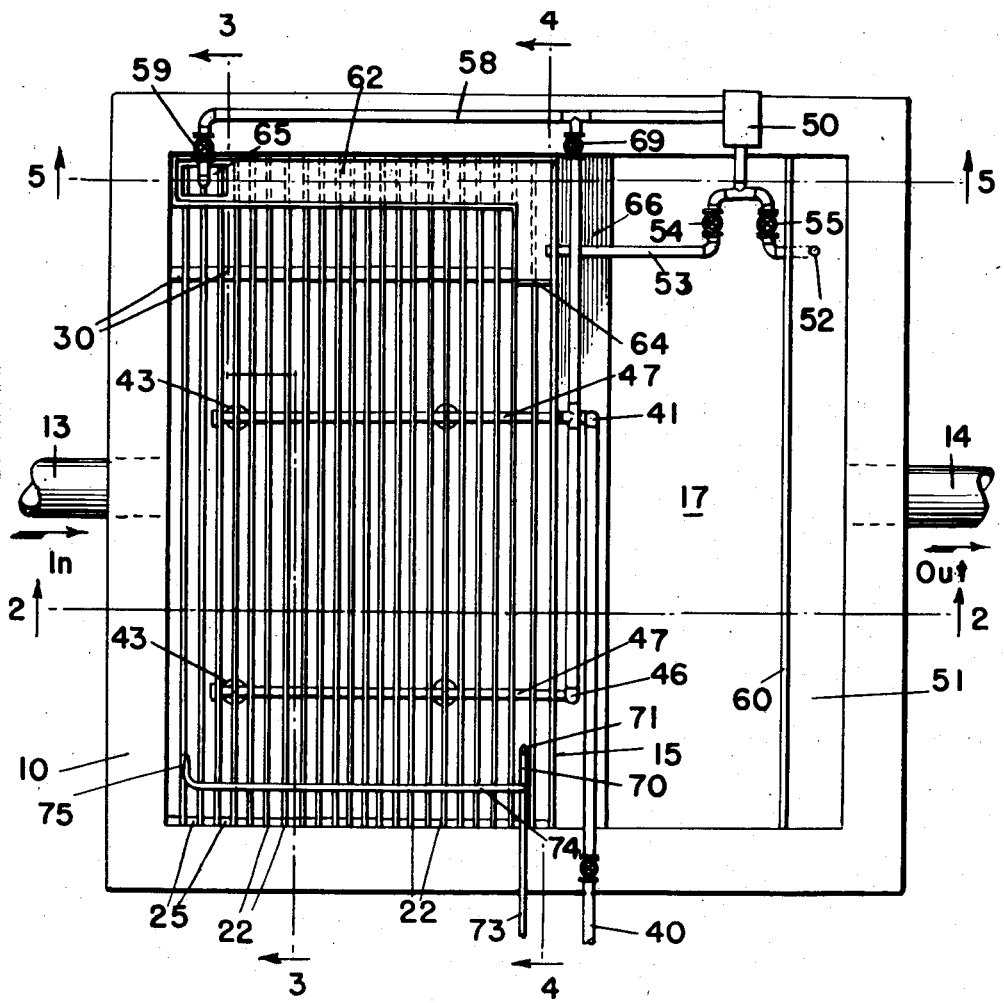
Figure 1 is a plan view.

In the particular embodiment chosen to illustrate the invention the tank 10 is roughly square in plan view having a hopper-shape bottom 11, provided with a sludge exit pipe 12, an entry pipe 13 and an exit pipe 14. The tank 10 is divided by a vertical partition 15 extending from side to side of the tank and extending well above the water level and to a point somewhat below the junction of the vertical and sloping walls of the tank. This partition 15 divides the tank into an aeration chamber 16 and a settling chamber or compartment 17. It is my preference that these two chambers be arranged as illustrated but obviously the aeration chamber 16 may be formed of a separate distinct tank and discharging thru a pipe or channel to the subsequent settling compartment 17 which then would be an individual tank.

In the aeration chamber 16 a series of plates extend from side to side and parallel to the partition 15 and the entry wall of the tank 10, every sixth plate numbered 20 extending well above the water level 21 in the tank while the intermediate plates numbered 22 terminate a bit under the normal water level, that is the liquid level in the tank when the air is not turned on. The plates are held in position in any well known and desired manner, my preference being to provide shoulders such as 26 which support the plates 20 and 22 and these are positioned by wooden spacers 25 which need only be about a foot long and two inches on the side. Similar wooden spacers 25 are provided at the upper corners. A one by one inch long wooden rod is positioned between each of the plates and this forms a baffle 30 extending to the top of the plates 22 and extending an appreciable distance below the plates. I find it rather convenient to attach a plate of tin or non-corroding material numbered 31 below the plate bottom line and secure this plate to any or all of the rods making the baffle 30.

In absence of the baffle or other equipment the sewage would flow in thru the pipe 13 and would pass between the plates 22 thru the first cell and then thru the plates 22 of the second cell, passing below the bottoms of the plates as the tops of plates 20 are high enough to prevent the wind from blowing the surface water in a direction from the influent end to the effluent end of the tank; in other words, to insure that the sewage shall pass consecutively thru the several cells before it passes out of the aeration chamber or tank. By having the baffle 30, however, a very different flow is obtained. Referring particularly to Figure 3, the inlet pipe 13 is discharging toward the observer and the general flow thru the tank is in the same direction. The addition of air to the tank, however, raises the water level 21 to a point such as 35 which is appreciably higher than the top of the baffle 30 which, as stated, is at the same level, or approximately so, as the plates 22. When the water level is thus raised from 21 to 35 the additional liquid spills to the right, as seen in Figure 3, and follows a downward path toward the hopper bottom. The application of the air in any usual way naturally causes a rise of the liquid in the major portion of the aeration chamber 16 and this rising liquid passes between the contact surface of the plates to which, in well known manner, cling the desired slimes of aerobic sewage organisms. These as they complete their function increase in size and slough off continuously and form flocs which are carried upward and then to the right above baffle 30 and downward in the smaller area stream in chamber 36 to the sludge hopper 37. Consequently the flow of the liquid is slowly in a helical path between the plates, a small portion going to the right at a quite rapid rate thru small chamber 36 and then upwardly to the left of the baffle 30 at a very much slower rate.

Air is supplied below the aeration plates 20 and 22 in any well known manner, my preference being to use an impinging device. Air is provided from any source thru a pipe 40 best seen in the top center of Figure 2, and in Figure 1. This supply pipe 40 is connected to a vertical pipe 41 and a horizontal pipe 42 leading upward to the impingers 43. The impinger is a mere bowl and it is soldered to the short nipple beneath it, the nipple having a number of radial holes. A vertical waterpipe 46 leads to a horizontal pipe 47 having a number of nipples 48 terminating just short of the bowls of the impingers which, of course, are mere injectors and specifically form no part of the invention except as a unit of a combination. When water is flowed under pressure to the pipe 46, is splashes in the basin 43 and pulls air from beneath which is discharged into the liquid in very small bubbles as is desired. The several impingers are well spaced apart, otherwise the tiny desired bubbles would coalesce into larger undesirable bubbles reducing the efficiency. By providing the baffle 30 I am enabled to place a series of impingers reasonably close to the baffle and to give maximum spread of the tiny bubbles. The two unions 48' permit detaching of the pipes 41 and 46 and thus the entire air supply device can be removed as a unit without disturbing the plates or the baffle 30.

While the supply of the water furnished thru vertical pipe 46 could be from any source, the taking of fresh water into the system is often highly undesirable as far as the settling compartment or tank is concerned so in order to keep the settling compartment at a minimum size the supply of the liquid to the pipe 46 is provided by a water pump 50 which receives its supply either from the effluent channel 51 thru the piping 52 or from a point in the aeration chamber 16 adjacent the partition 15 by means of piping 53. Valves 54 and 55 are opened or closed as desired in order to change the source of supply. The water pump 50 also pumps water thru the pipe 58 to the initial end of the first cell of the aeration compartment, this pipe having a valve 59. The effluent channel 51, seen at the upper right hand corner of Figure 2, includes the usual effluent weir 60 as its vertical side, this weir extending up to the normal water level 21.

Figure 2:
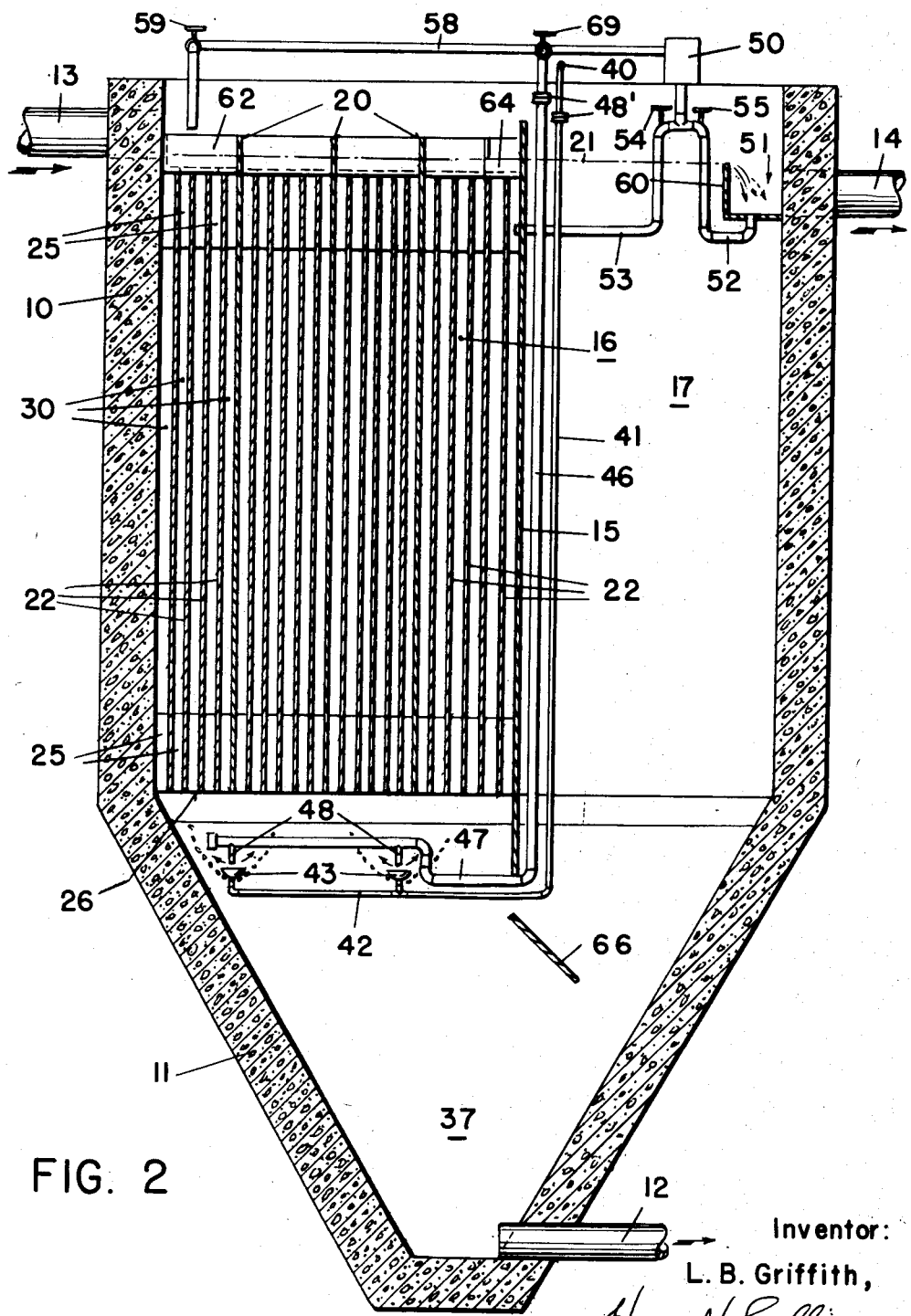
Figure 2 is a vertical section on line 2—2 of Figure 1.

A circulating trough 62 is seen in Figure 1 to consist of an L-shaped metal channel having a receiving notch 64 in its short leg and having a hole 65 at the bottom of its exit end adjacent the initial wall of the tank 10. The piping 58 discharges into the circulating trough immediately above the hole 65. The action of the trough 62 is quite simple. When the liquid is at the normal water level 21 no liquid passes to the recirculating trough 62. As the level is raised from point 21 to point 35, the raised liquid flows freely thru the notch or weir 64 at the entry end of the short leg of the L and flows from right to left as seen in Figures 1 and 2. This liquid flows freely thru the hole 65 for the simple reason that there is no air lift below the hole 65, the hole is below the weir edge of the notch 64, and the liquid at hole 65 seeks the level 21 when the air is on.

The deflector 66 is of great importance. It is a mere baffle plate extending from side to side of the tank 10 and at the angle shown in Figure 2. Since there is no oxygen at the bottom of the tank, there is necessarily some formation of carbon dioxide gas at this point. It is quite undesirable to let this carbon dioxide gas go out the exit pipe 14, hence the deflector 66 is positioned so as to direct these bubbles to a point below the aeration chamber so that the bubbles will pass upwardly thru the final or other cell of the aeration section.

The action of the contact-clarifier tank is as follows: The settled sewage flowing into the tank passes thru entry pipe 13 in about the center of the tank and just above the normal water line. Because of the air passing upwardly thru the plates 22 and 20, a portion of the sewage is drawn away from the observer as seen in Figures 1 and 2 and passes downwardly thru the relatively narrow passageway 36 toward the hopper bottom. It rises either again thru the same passage or between the next successive plates, by virtue of the action of air bubbles and hence the sewage in the first cell is constantly revolving in a helical path.

A portion of this passes to the second cell, that is between the plates 20 which rise above the water level and also the aerated water surface 35, and in normal process the liquid moves towards the partition 15 between the aeration compartment 16 and the settling compartment 17 which are in communication below the bottom of the partition 15. There is no air lift in compartment 17 and hence the liquid therein tends to settle out its solid particles which pass freely down deflector 66 and collect as compacted sludge at the very bottom of the hopper section 11 from whence it is removed from time to time thru the pipe 12.

Since systems of this type are particularly suitable for places in which the requirements vary largely as, for instance, a camp which might have ten times the population in summer that it does in winter or where the requirements are increased greatly over the week-end, for example, it is necessary to insure a recirculation of the material. At times the liquid portion of this flow is drawn from the exit portion of the aeration chamber 16 and at other times it is best not to take any liquid from here but to take the entire supply from the effluent end as, for example, from the pipe 14. This is readily accomplished by closing the valve 54 and opening the valve 55 in which case recirculation is had from effluent channel 51 thru pipe 52 past valve 54 to water pump 50 and thence thru piping 58 past valve 59 to the initial cell of the aeration chamber. The liquid required for air supply is controlled thru valve 69 which controls recirculation thru the impingers, and is located just above the unions 48'.

An optional recirculator is shown in Figures 1 and 4. A U-tube 70 has its mouth 71 just below the water level 21 and receives air thru pipe 73. This air lift causes flow from the rear end of the aeration chamber to its entry end thru horizontal pipe 74, the end of which is turned as at 75 to direct the recirculating fluid away from the near side wall of the tank at the influent end, thus increasing, as does the trough 62, the number of passes without affecting the detention period in the settling tank.

By means of a deflector baffle 66 I can prevent the sludge, which has settled out in the settling unit hopper 37, from rising in large masses and floating over the settling tank weir 60 and polluting the treated final effluent. This baffle is of greatest importance because it is impossible in practice to draw all the sludge out of the sludge hopper and the sludge that remains in the hopper will after several hours begin to get septic and gas bubbles will form until these bubbles finally start upward carrying with them masses of the septic sludge. If it goes up into the aerator the mass is broken up, gas released and the freshened particles of sludge will then resettle in the sludge hopper. But if these rising masses of sludge should go up in the settling compartment they will float over the weir 60 and pollute the treated effluent.

By means of the transverse strip baffle 30 in the contact aerator I can exclude most of the air bubbles from the (downward flowing) portion 37 of the aerator and make it possible to produce a relatively quiescent uniform viscous flow downward with few or no rising air bubbles so that the organic growths which are continuously sloughing off of the plates in great quantities will be carried downward in this viscous flow to form a sludge blanket over top of the sludge hopper 37; also this baffle 30 will permit a more definite helical flow of the sewage thru each passageway formed of adjacent two plates and since this spiral flow is of a relatively high velocity it will intercept the slower movement of the sewage thru the aerator and thereby prevent the short circuiting of the sewage under the contact plates from the influent to the effluent end of the aerator.

What I claim is:

1. A sewage treatment tank having an entrance, an exit, and a sludge receiving portion, an aeration chamber above the sludge receiving portion positioned to one side of the tank, a settling chamber parallel to the aeration chamber and located in the other side of the tank, a vertical baffle transverse of the direction of flow of the sewage extending from side to side of the tank and rising above the water level to separate the aeration chamber from the settling chamber, means for passing air bubbles thru the aeration chamber, and a sloping deflector above the settled sludge and beneath the edge of the vertical baffle adjacent the aeration chamber for directing gas bubbles from the settled sludge thru the aeration chamber, whereby to prevent the gas bubbles from carrying septic sludge from the settling chamber to the exit of the tank, thus preventing pollution of the treated effluent by the septic sludge particles carried by the gas bubbles.

2. A sewage treatment tank including means to hold the liquid at a chosen water level, a tank entrance, a plurality of units transverse of said entrance, each unit including a plurality of intermediate plates extending from a chosen distance above the bottom of the tank to a height approximating the water level, and a final plate parallel to the intermediate plates and extending above said water level, a longitudinal baffle within the tank dividing the tank into a major portion and a minor portion, means for bubbling air within the chamber to the major side only of said baffle whereby the air-elevated fluid will flow laterally over the baffle, thru the plates in the minor portion and will rise in the major portion by action of the air bubbles, and a trough having its entrance end in the major portion of the tank and above the chosen water level but below the level of the air elevated fluid and having its exit end in the minor portion of the tank at a lower level than the entrance to the trough.

3. In a sewage treatment tank having an entrance and an exit, a weir near the exit end establishing a water level within the tank, a transverse partition dividing the tank into an initial aeration chamber and a final settling compartment, means for flowing sewage from adjacent the partition to a point proximate the entrance end, air lift means for transferring fluid from adjacent the partition to the entrance end of the aeration chamber, and separate means selectively pumping water from adjacent the weir and adjacent the partition, to the entrance end of the tank whereby liquid can be flowed to the entrance end of the tank by three independent means.

4. In a sewage system, a tank approximately square in plan having an inlet, an exit, a hopper bottom, a weir to provide a water level, and being divided laterally by a partition into an aeration chamber and a settling compartment, said partition extending from side to side, rising to a level above the water level and leaving a space at the bottom at least as great as the longitudinal dimension of the settling compartment, a plurality of plates extending laterally in the aeration chamber rising to a point approximating the water level and extending downwardly to a point short of the bottom of the partition, a plurality of additional plates rising above the water level, a plurality of spacing rods between adjacent plates to form a longitudinal baffle dividing the aeration chamber into a major portion and a minor portion, means for discharging air at separated points beneath the major portion of the aeration chamber, a recirculating trough extending above the lower plates having its entrance within the major portion and having an exit above the minor portion, said trough discharging liquid from a point adjacent the partition to a point adjacent the front wall of the tank, a pump having its entry end connected to a point within the settling compartment and a point within the aeration chamber, valves for selectively controlling the relative flow from the settling compartment and the aeration chamber, piping connecting the pump to discharge into the aeration chamber in the path of the discharged air, and a deflector in the tank below the partition being tilted toward the aeration chamber, said deflector being positioned in the path of gases rising from the hopper bottom so that these gases are deflected away from the settling compartment and to a point below the aeration chamber.

5. A partition assembly for a sewage tank comprising a plurality of vertical, spaced plates to extend from side to side of the tank to form cells spaced from the top of the tank and from the bottom of the tank, a plurality of intermediate plates between the spaced plates and terminating short thereof at the top and short of the bottom of the tank at their bottom, and a vertical rod between adjacent plates alined to form a vertical baffle parallel to one wall of the tank between the center of the tank and one wall, said rods at their tops terminating short of the tops of the spaced cell forming plates and at their bottoms being short of the tank bottom.

6. The assembly of claim 5 plus an L-shaped trough on top of the plates with one arm of the trough projecting from the side of the tank beyond the margin of the baffle, said trough having an intake the bottom of which is at a higher level than the tops of the intermediate plates.

LLEWELLYN BROOKS GRIFFITH.

References Cited in the file of this patent

UNITED STATES PATENTS

| Number | Name | Date |
|---|---|---|
| 1,286,775 | Rein et al. | Dec. 3, 1918 |
| 1,574,783 | Beth | Mar. 2, 1926 |
| 1,700,723 | Imhoff | Jan. 29, 1929 |
| 1,739,302 | Gregorich | Dec. 10, 1929 |
| 1,939,924 | Schimrigk | Dec. 19, 1933 |
| 2,126,164 | Anderson | Aug. 9, 1938 |
| 2,126,228 | Streander | Aug. 9, 1938 |
| 2,144,385 | Nordell | Jan. 17, 1939 |
| 2,188,162 | Schulhoff | Jan. 23, 1940 |
| 2,323,437 | Yeomans et al. | July 6, 1943 |
| 2,388,795 | Montgomery et al. | Nov. 13, 1945 |
| 2,389,357 | Griffith | Nov. 20, 1945 |
| 2,458,163 | Hays | Jan. 4, 1949 |

FOREIGN PATENTS

| Number | Country | Date |
|---|---|---|
| 497,216 | Germany | May 3, 1930 |
| 561,395 | Germany | Feb. 22, 1933 |